United States Patent [19]
Dodt et al.

[11] Patent Number: 5,598,479
[45] Date of Patent: Jan. 28, 1997

[54] DEVICE FOR REDUCING TIRE/ROAD SURFACE NOISE

[75] Inventors: Thomas Dodt, Hanover; Frank Gauterin, Neustadt; Thomas Schulze, Hanover; Geert Roik, Cremlingen; Heinrich Huinink, Garbsen, all of Germany

[73] Assignee: Continental Aktiengesellschaft, Hanover, Germany

[21] Appl. No.: 381,411

[22] Filed: Jan. 30, 1995

[30] Foreign Application Priority Data

Jan. 29, 1994 [DE] Germany ............... 44 02 699.4

[51] Int. Cl.$^6$ ............................................. G10K 11/16
[52] U.S. Cl. ..................... 381/71; 381/86; 181/210; 181/224; 181/271; 181/286
[58] Field of Search ........................ 381/71, 94, 86; 181/210, 224, 271, 284, 286; 267/140.14, 140.15

[56] References Cited

U.S. PATENT DOCUMENTS 5,394,478  2/1995  Hathaway et al. ............... 381/86

FOREIGN PATENT DOCUMENTS

3428468  2/1986  Germany .
3729765  3/1989  Germany .

Primary Examiner—Forester W. Isen
Attorney, Agent, or Firm—Robert W. Becker & Associates

[57] ABSTRACT

A device for reducing certain sound ranges of tire/road surface noise of a motor vehicle includes sound absorbers in the form of resonators positioned at the inner wall of a wheel well of the vehicle in the area of sound projection of the tire/road surface noise. The device has an electronic control device for receiving a signal preferably derived from an ABS system in the form of the wheel rpm. The control device adjusts the resonators according to the number of tread blocks of the tire, the sound emission characteristics, and the wheel rpm. In another embodiment the electronic control device is supplied with signals received from a sound receiver that records the course over time of the sound pressure. The control device adjusts the resonators such that the measured sound pressure signal is minimized. In another alternative the device has a data processing unit including an electronic control device. The control device is supplied with a signal from sound receiving devices that record the course over time of the sound pressure. The data processing unit together with an adjusting device adjusts the resonators such that the measured sound pressure signal for selected frequency ranges is minimized.

83 Claims, 11 Drawing Sheets

DEVICE FOR REDUCING TIRE/ROAD SURFACE NOISE

BACKGROUND OF THE INVENTION

The present invention relates to a device for reducing certain sound ranges of tire/road noise emitted by a motorized vehicle, whereby in the area of sound projection of the tire/road surface noise sound absorbers in the form of resonators are arranged that are adjustable to sound ranges the frequencies of which change proportional to the rpm of the wheel. Two of three alternatives of the invention require the presence of ABS (anti-lock braking system).

The noise caused by traffic is one of the most disturbing sources of noise pollution. The noise sources of a motorized vehicle are engine and tires whereby on high-speed thoroughfares and cobblestone surfaces, especially when the surfaces are wet, the tire/road surface noise is predominant. Since the increased use of sound proofing encapsulations for the engine, the tire/road surface noise has become more prominent. Truck tires, due to their construction, cause a more unpleasant rolling noise than automobile tires. From the standpoint of financial and aesthetic reasons, measures that can be undertaken directly at the source of noise are especially advantageous.

For automobile and truck tires it has been conventional for the last couple of years to provide the tread elements or blocks arranged sequentially in the circumferential direction of the tire with different circumferential lengths (pitch). For example, it is conventional to select three to five different pitch lengths with suitable length ratios relative to one another and with a favorable arrangement (pitch sequence) over the circumference of the tire while taking into consideration other tread properties.

The object is in general the randomization of the tire/road surface noise, which results especially in a distribution of the occurring frequencies over a broader frequency band.

However, it still cannot be prevented that the tire at certain frequencies, which change proportional to the rpm of the wheel, emits sound pressure. These frequencies can be detected as a permanent peak in a so-called order spectrum. These peaks may have different causes, for example, the mold partition of the vulcanization mold, the total number of pitches over the circumference of the tire, the actual geometry of the pitches (tread blocks) or possible periodic occurrences within the pitch sequence. For example, it is known to a person skilled in the art that a tire with, for example, 70 pitches (tread elements) over the circumference of the tire emits dominantly the 70th harmonic of the rpm of the wheel, which however is not always true because the different causes overlap one another and have an effect on one another. In general, it can be said that the rolling noise of each tire comprises sound ranges with discrete frequencies or a narrow frequency band at which predominant sound pressure can be detected the frequencies of which change proportional to the number of revolutions (rpm) of the wheel.

From German Patent 34 28 468 a device is known that is mounted to the vehicle wheel and rotates with the wheel. The device comprises one or more resonators with hollow chambers the volumes of which are controlled as a function of the velocity by centrifugal forces. The resonators may be partly embodied as Helmholtz resonators.

From German Offenlegungsschrift 37 29 765 a device is known that is arranged in the area between the rear partition of the passenger compartment and the trunk and which comprises an arrangement of Helmholtz resonators of a large volume. This device is designed to combat especially sound ranges below 80 hertz.

It is therefore an object of the present invention to provide a device for reducing tire/road surface noise, especially such sound ranges that change their frequency proportional to the speed of the motorized vehicle.

SUMMARY OF THE INVENTION

The present invention is primarily characterized by providing a motorized vehicle with resonators connected to the inner wall of the wheel well. The present invention encompasses three variants of this basic principle.

In a first variant of the present invention the device is primarily characterized by:

Sound absorbers in the form of resonators positioned in the area of sound projection of the tire/road surface noise, the resonators adjustable to sound ranges that are proportional to the rpm of the wheel;

The resonators connected to the inner wall of a wheel well of the motorized vehicle;

An electronic control device for receiving a signal derived from the ABS system in the form of the rpm of the wheel;

The electronic control device adjusting the resonators as a function of a total number of tread blocks of the tire, the sound emission characteristics, and the rpm of the wheel.

According to a second variant of the present invention, the device is primarily characterized by:

Sound absorbers in the form of resonators positioned in the area of sound projection of the tire/road surface noise, the resonators adjustable to sound ranges of adjustable frequencies;

The resonators connected to the inner wall of a wheel well of the motorized vehicle;

An electronic control device;

At least one sound receiver for receiving the sound emission;

The at least one sound receiver transmitting signals of the sound pressure as a function of time to the electronic control device;

An adjusting device for adjusting the resonators such that the measured sound pressure signal is minimized.

According to a third variant of the present invention the device is primarily characterized by:

Sound absorbers in the form of resonators positioned in the area of sound projection of the tire/road surface noise, the resonators adjustable to sound ranges that are proportional to the rpm of the wheel;

The resonators connected to the inner wall of a wheel well of the motorized vehicle;

A data processing unit comprising an electronic control device;

At least one sound receiver for receiving the sound emissions;

The at least one sound receiver transmitting signals of the sound pressure as a function of time to the electronic control device;

An adjusting device, connected downstream of the data processing unit, for adjusting the resonators such that for selected frequency ranges of the rpm of the wheel the measured sound pressure signal is minimized.

The suggested devices of the present invention can effectively and in a directed manner substantially reduce or even eliminate certain sound ranges of tire/road surface noise of tires the frequency of which is proportional to the rpm of the wheel. This results in an overall lowering of the noise level in the direct vicinity of as well as in areas farther away from the motor vehicle as well as within the interior of the motor vehicle. It is especially possible to lower the intensity of certain frequencies and tonal sounds which are commonly perceived as especially disturbing.

Preferably, in any of the three variants the resonators are narrow band resonators having characteristic frequency ranges that are adjustable. Advantageously, the characteristic frequency ranges of each resonator is adjusted at least with respect to one of the frequencies of the tire/road surface noise which are changing with the rpm of the wheel. Expediently, in all of the three variants of the present invention, at least one of the resonators is selected from the group consisting of a Helmholtz resonator, a Lambda/4 resonator, and a hole resonator.

In a preferred embodiment of any of the three variants, the resonator is a Helmholtz resonator having an adjustable component in the form of an adjustable resonator neck length or an adjustable resonator opening. Preferably, the resonator comprises a double wall bellows having an interior chamber that is inflatable with a variable air pressure. Advantageously, the bellows is made of a material such as rubber or plastic. In another embodiment, the resonator comprises a resonator neck in the form of a bellows-shaped hollow body having an inner wall with a wedge-shaped projection, wherein the bellows-shaped body is inflatable with a variable air pressure. Preferably, the resonator neck comprises an adjusting mechanism for adjusting the inner diameter of the resonator neck. The mechanism preferably comprises a pressure-sensitive diaphragm. In a preferred embodiment of the three variants, a plurality of Helmholtz resonators is arranged in a common housing, wherein the Helmholtz resonators each have a different interior volume and each have an opening. The device further comprises a slidable grid structure with holes, wherein in an initial position of the grid structure the holes and the openings of the Helmholtz resonators are positioned congruent to one another. Preferably, the openings of the Helmholtz resonators have different sizes.

In a preferred embodiment of all three variants, the resonator has a variable hollow chamber volume. A plurality of such resonators are arranged adjacent to one another in a linear arrangement, and adjacent ones of the resonators have a common wall. The common walls and external walls of the resonators positioned in end positions of the linear arrangement are in the form of double walls with expendable walls or with at least partially expendable walls, wherein the interior of the double walls is inflatable with a variable air pressure.

Preferably, the electronic control device comprises adjusting means for adjusting the resonators, the means selected from the group consisting of electric, pneumatic, and hydraulic adjusting means.

In yet another embodiment of the present invention, the inventive device variants have a resonator that comprises walls and an element for changing the wall impedance of at least one of the walls. The element is preferably a loudspeaker. Advantageously, the element is connected to the surface of the at least one wall and is in the form of a piezo foil or a piezo ceramic element. Alternatively, the resonator comprises a sound receiver for providing an input variable for the control device for controlling the resonator. The sound receiver is preferably a microphone.

Advantageously, the control device comprises a device for switching the resonators.

Preferably, the control device adjusts the resonance frequencies of the spatially distributed resonators to the spatial and variable distribution of the impinging sound.

In another embodiment of the present invention the intermediate spaces between the resonators are filled with sound-absorbing material selected from the group consisting of foam rubber, foamed plastic, glass wool, and rock wool.

Advantageously, in all variants air flows through the resonators.

Preferably, the resonators have openings that are coupled so as to be substantially sound transmissive, wherein the material for covering is in the form of a diaphragm, a foil or a fabric.

In a preferred embodiment of the second variant, the at least one sound receiver is positioned in front of the resonators and the electronic control device adjusts the resonators according to data analysis selected from the group consisting of a frequency analysis and an order analysis. Instead of being positioned in front of the resonators, the sound receiver may also be positioned at the resonators.

The sound absorbers of the present invention are especially narrow-band absorbers wherein the characteristic frequency range can be adjusted as a function of the rpm of the wheel. Broad-band absorbers would be less effective, and narrow-band, non-variable absorbers could not cover the frequency range which changes with the rpm of the wheel, respectively, the velocity of the motor vehicle.

It is furthermore advantageous that the inventive device is designed such that the characteristic frequency range of each sound absorber is correlated with at least one of the frequencies of the rolling noise that changes with the rpm of the wheel and is adjusted accordingly when the rpm of the wheel changes.

The adjustable sound absorbers can be especially Helmholtz resonators, Lambda/4 resonators or hole resonators.

According to a preferred embodiment of the invention the Helmholtz resonators have a variable resonator neck length or a variable resonator opening.

Preferably, resonators with an adjustable interior volume are used. A variation of the resonator neck length is easily possible when the resonator has a resonator neck in the form of a double wall bellows, especially made of rubber or plastic, whereby the interior of the bellows can be inflated with adjustable air pressure.

One embodiment in which the resonator inlet opening is adjustable, is comprised of providing a resonator neck in the form of a bellows-shaped hollow body the inner wall of which is provided with a circumferential wedge-shaped projection. The bellows-shaped body can be subjected to variable air pressure. For adjusting the inlet opening, it is also possible to change the diameter of the resonator neck with a controllable mechanism, for example, a pressure-controlled diaphragm.

In yet another embodiment of the present invention, a plurality of Helmholtz resonators with different interior volumes are arranged in a common housing or box. Above the openings of these resonators, which openings are preferably of different sizes, a slidable grid structure is arranged. This grid structure has holes and in an initial position is arranged such that the holes of the grid structure are congruent with the openings of the resonators. When sliding the grid structure across the housing, a partial closing or opening of the openings of the resonators is possible so that it is possible to change the characteristic frequency of the individual resonators also in this manner.

In another embodiment of the present invention a plurality of resonators with different interior volumes are arranged adjacent to one another. They have common walls, and these common walls as well as the walls at the end of the arrangement are in the form of bellows with double walls. The interior of the bellows can be subjected to a variable air pressure.

In this manner, a simple and suitable adjustment of the characteristic frequencies of the resonators with a corresponding enlargement or reduction of the interior volume of the resonators can be achieved.

In a further simple embodiment of the invention a plurality of resonators with different interior volumes are arranged adjacent to one another whereby their walls are at least partially embodied as bellows hollow interior of which can be loaded with variable air pressure.

An adjustment of the resonators can be achieved in a simple manner by providing an electronic control device that as a control parameter receives the rpm of the wheel. Based on this parameter and according to the total number of tread blocks of the tire and the sound projection characteristic the control device effects a control of the resonators.

In another variant of the present invention the wall impedance of at least one wall of the resonator can be changed. For example, a loudspeaker is introduced into one of the resonator walls. Alternatively, a piezofoil or a piezor ceramic element is attached to the resonator wall. By changing the wall impedance, the resonance frequency of the resonator can be affected for certain frequency ranges in the same manner as by changing the volume of the resonator.

The control of these embodiments is possible by providing in front of or at the resonator sound receivers, for example, microphones, that record the course over time of the sound pressure and relay this information to the control device. According to a frequency or order analysis the control device effects an adjustment of the resonators.

As an alternative thereto or in combination therewith, the resonator may be provided with a sensor, for example, a microphone, which also delivers an initial parameter for the control device for controlling the resonators.

The control device may further be supplied with a further parameter in the form of the rpm of the wheel. In motorized vehicles that are equipped with an ABS system, the sensors already present for determining the rpm of the wheels can provide this parameter to the control device.

In another advantageous embodiment of the present invention, the control device may be provided with a device for switching the resonators as a function of the velocity of the vehicle. Thus, the control range of each individual resonator can be reduced. In addition, for certain motor vehicle velocities dominating orders of the harmonic analysis can be effectively influenced.

The control device can further be designed such that it adjusts the resonance frequencies of the spatially distributed resonators to the spatial and rpm-dependent distribution of the incoming sound.

In order to considerably improve the sound absorption of the system in higher frequency ranges (approximately above 800 hertz), i.e., at high orders and higher velocities, the intermediate space between the resonators, including the space between the resonator openings and/or the resonator necks, can be filled with sound proofing material, for example, foamed rubber, foamed plastic, glass wool, rock wool etc.

A soiling of the resonators can be avoided by allowing air to flow through them. In an alternative it is possible to cover the resonator openings with acoustically essentially neutral materials, for example, a membrane, a foil, a fabric or a cap.

Inventively, the sound absorbers are arranged at the inner wall of the wheel well that at least partially encloses the wheel. This is especially advantageous with respect to heavy trucks in which the wheel wells in general project outwardly past the wheels to a great extent.

However, it is also possible to provide the sound absorbers at the vehicle frame. It is advantageous to position the sound absorbers at least in the areas of main sound projection of the tire/road surface noise.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 10.

Figure 1A:
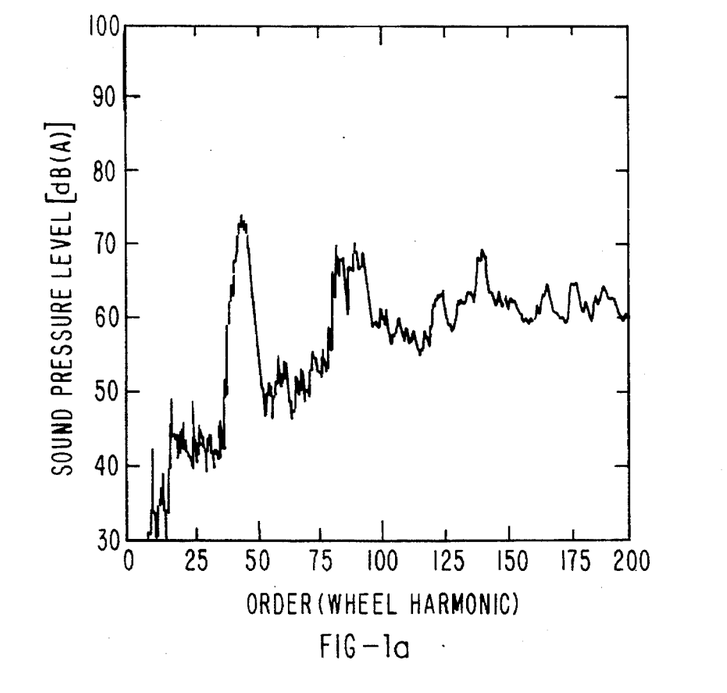
FIG. 1a shows a typical order spectrum of a truck tire.

FIG. 1a shows a typical order spectrum of a truck tire of today's conventional construction. The ordinate represents the sound pressure level and the abscissa shows the order number. In addition to the base noise, the order spectrum shows prominent maxima the frequency of which depends on the velocity of the vehicle. Typically, the 100th order at 100 km/h corresponds to a sound frequency of 830 hertz whereby this frequency changes proportionally with a change of the velocity.

The presence of a number of prominent peaks in the order spectrum of many truck tires, despite the arrangement of tread blocks of different pitches over the circumference of the tire in a selected pitch sequence, stems from the fact that the selection of maximum pitch length ratios is limited because high pitch length ratios are unfavorable with respect to wear of the tire tread. The maximum pitch length ratio, i.e., the ratio of the length of the longest pitch to the length of the shortest pitch, is commonly selected for truck tread strips to be smaller or approximately equal to 1.2. Certain harmonics of the rpm of the wheel thus occur very prominently. In the shown embodiment of FIG. 1a these are especially of the order in the area of the order number 46 (=N), the order number 92 (=2N), and the order number 138

(=3N) with N being the total number of pitches distributed over the circumference of the tire.

Figure 1B:
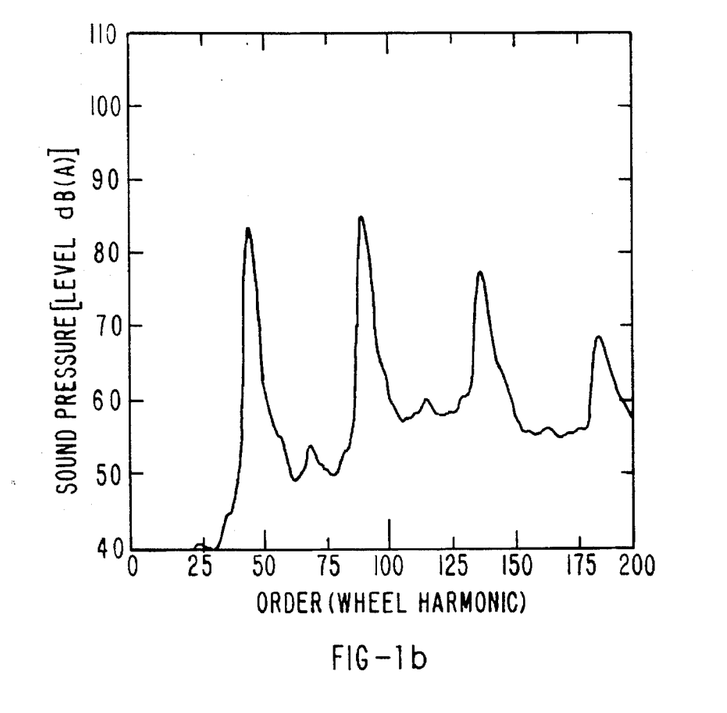
FIG. 1b shows the order spectrum of a truck tire with uniform tread block distribution.

In FIG. 1b a similar spectrum for a truck tire is represented. For the tread of this tire no pitches of different lengths have been used. The thus resulting wheel harmonic (tread block number and multiples thereof) are thus prominently visible.

Figure 1C:
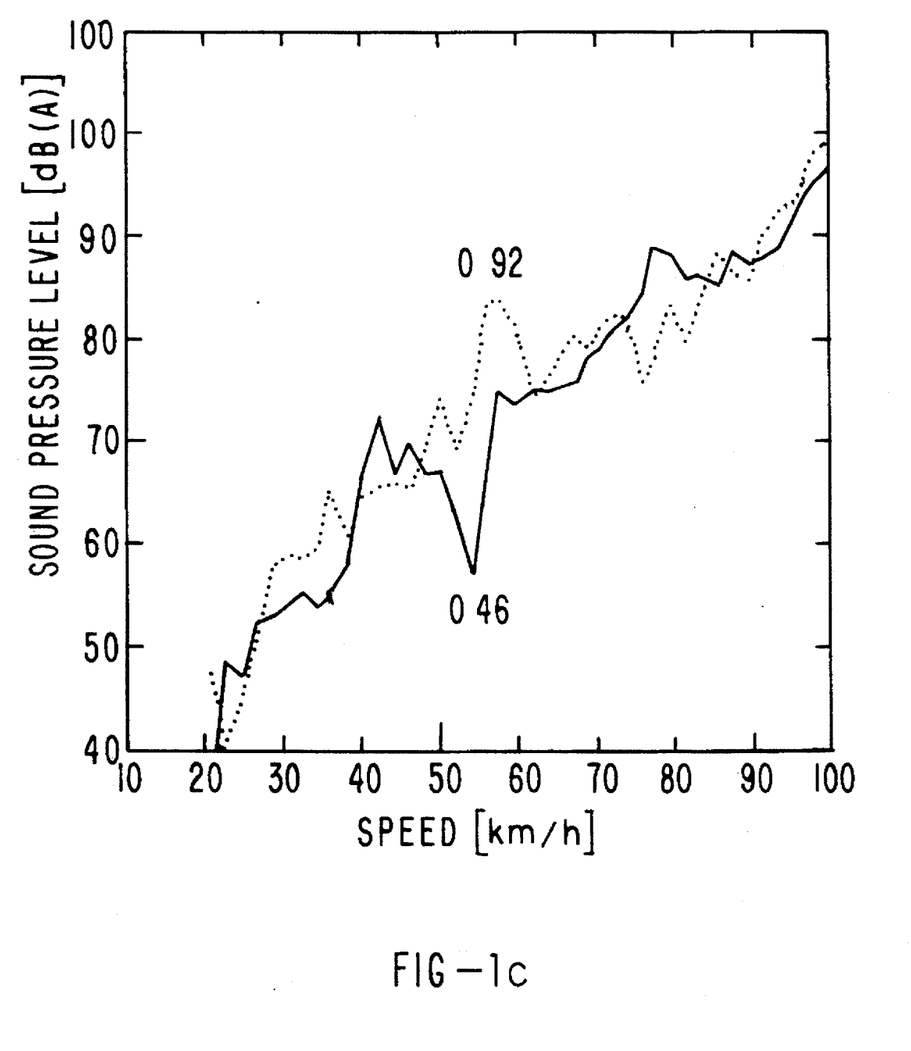
FIG. 1c shows exemplary the course of the sound pressure level as a function of the velocity.

FIG. 1c shows exemplary the noise portions of two different orders (46th and 92nd wheel harmonic) as a function of the velocity. The dependence of the sound pressure level of the two orders from the velocity is clearly visible.

In the following, the measures suggested with the present invention that result in a directed reduction of disturbing orders (orders of high amplitude) will be explained.

Figure 2:
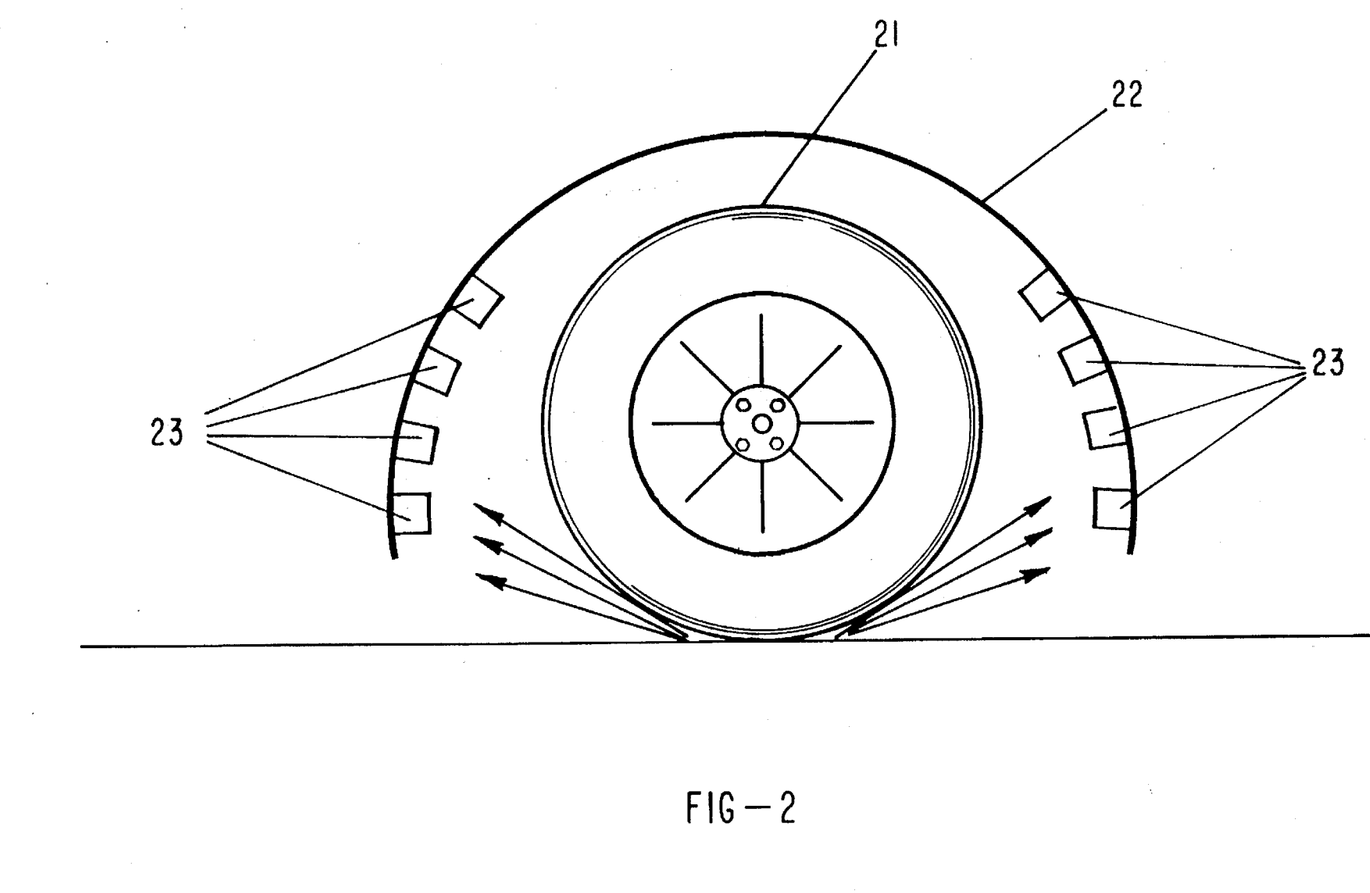
FIG. 2 shows schematically one possibility of the general arrangement of absorbers at the vehicle.

A possibility for the general arrangement of resonators at a vehicle are shown in FIG. 2. Schematically represented is a wheel 21 with tire in a side view together with the wheel well 22 surrounding the wheel 21. The main sound projection of the tire/road surface noise of the tire portion coming into contact with the road surface and the tire portion leaving the road surface are shown as bundles of arrows. It is advantageous to first measure the sound projection fields in order to be able to determine a favorable arrangement of the resonators at the inner wall of the wheel well 22. In the two main areas of sound projection it is advantageous to provide for each disturbing peak within the order spectrum of the tire at least one correspondingly selected resonator that is adjustable according to the occurring velocity changes.

In the embodiments represented in FIGS. 3 to 9, which will be described in the following, it is suggested to provide an electronic control device for calculating and carrying out the adjustment of the absorbers to the respective disturbing peaks.

In the context of the present invention absorbers based on the principle of Helmholtz resonators are especially favorable. A Helmholtz resonator, as is known in general, is comprised of a hollow chamber the compressive air volume V of which acts as a spring while the air within the resonator neck, which has a certain length and a certain cross-sectional surface area, forms the swinging mass. According to the invention the characteristic frequency range of the resonators, i.e., the frequency range of maximum absorption, is adapted to the actual tire noise.

The measures to be undertaken for adapting, respectively, changing the frequency ranges of maximum absorption are based on the fact that the characteristic frequency range of such resonators is directly proportional to the cross-sectional surface area of the resonator neck and is inversely proportional to the square root of the volume of the hollow chamber and to the square root of the length of the resonator neck.

Figure 3:
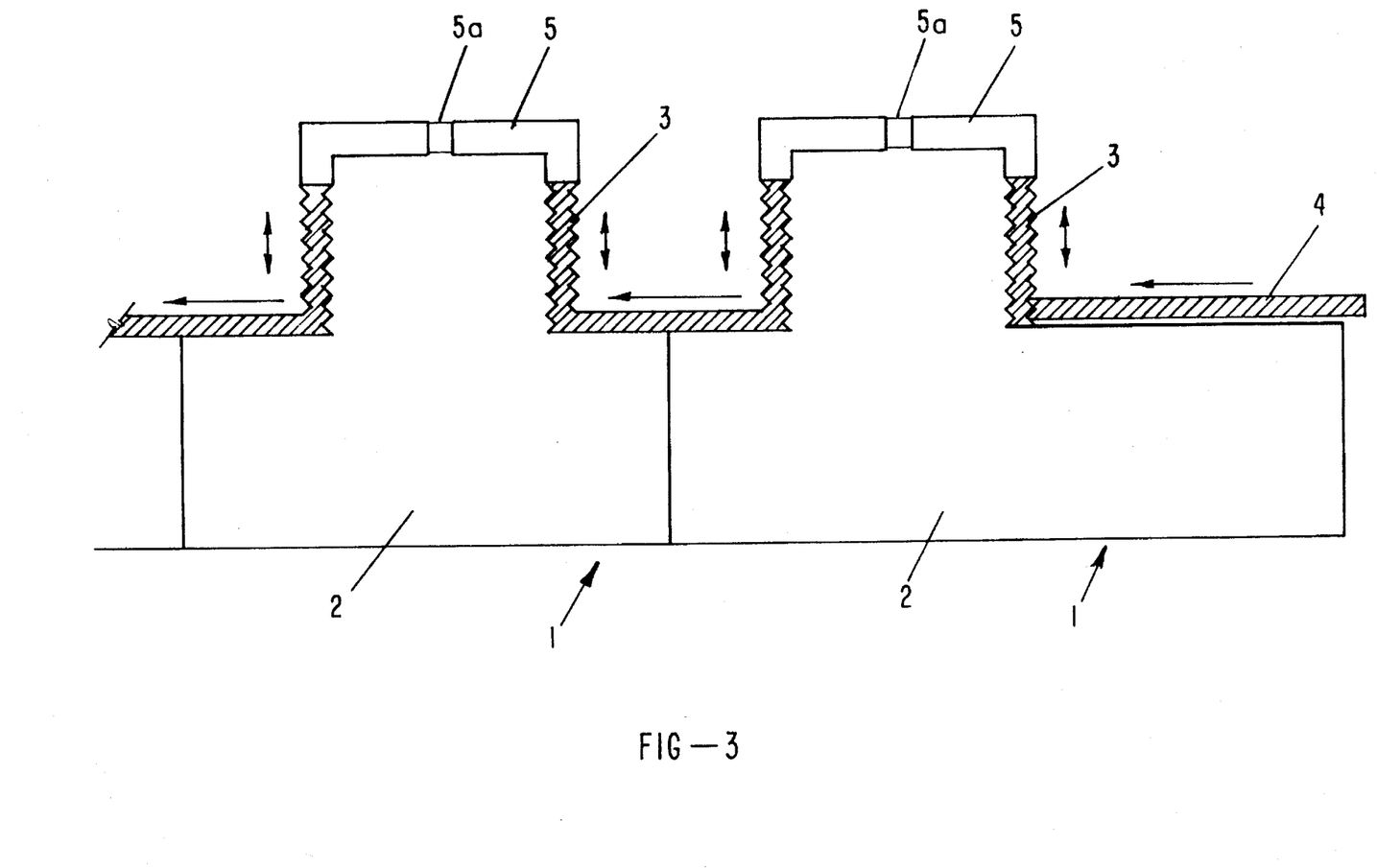
FIGS. 3–8 show different embodiments of sound absorbers to be used in conjunction with the present invention in a sectional view, whereby

FIG. 3 shows an embodiment of the invention with adjacently arranged resonators 1 with hollow chambers 2 of different volumes. The walls of the resonator hollow chambers 2 may be comprised of plastic. Each hollow chamber 2 of a resonator is provided with a resonator neck which is in the form of a double wall bellows 3 made of rubber or plastic. Plates 5 are seated on the bellows 3 which have resonator openings 5a. Via an air inlet line 4 all bellows 3 can be simultaneously subjected to compressed air so that the resonator neck length can be changed by a corresponding pressure change. This is indicated with double arrows in FIG. 3. In this embodiment the double wall bellows 3 are of the same size.

Figure 4:
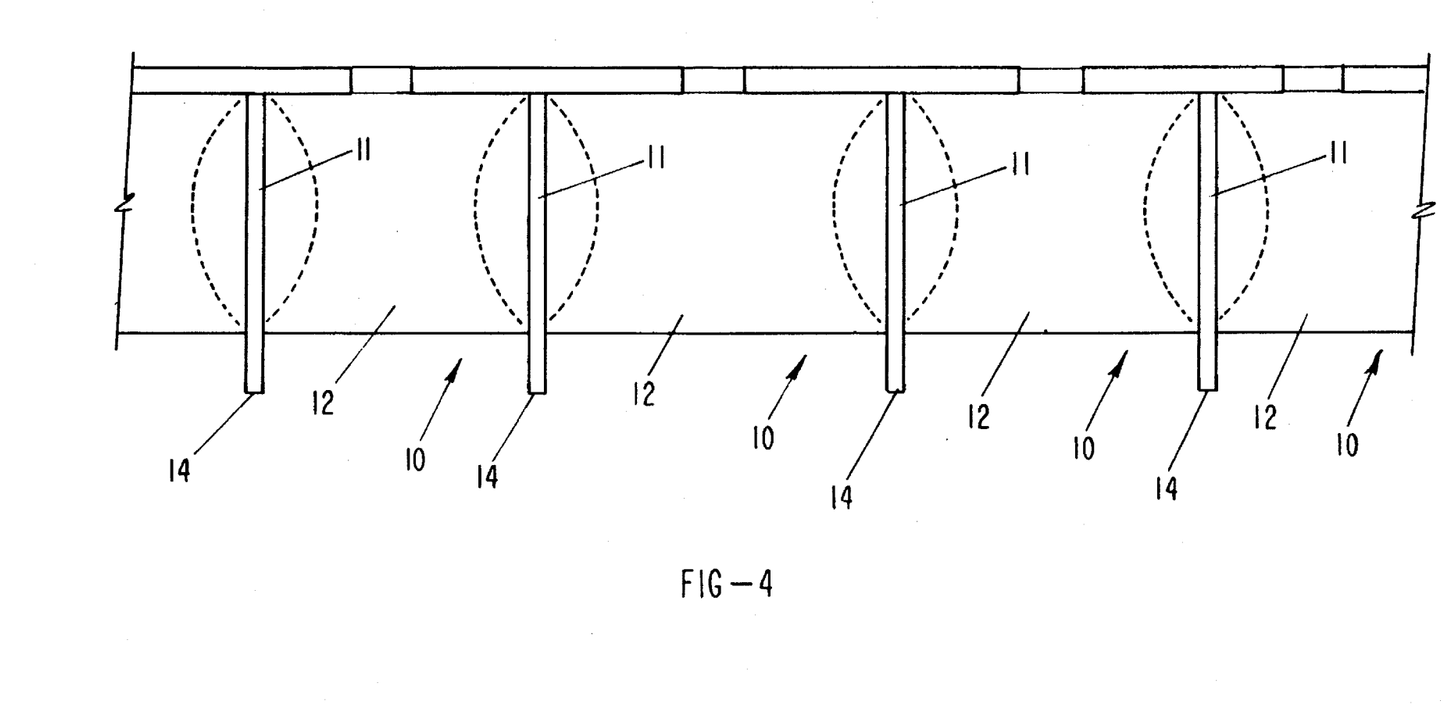

FIG. 4 shows an embodiment with a plurality of adjacently arranged resonators 10 with hollow chambers 12 of different volumes. The hollow chambers 12 of the individual resonators 10 are separated from one another by partitions 11 that are double-walled and embodied in the form of expandable diaphragms so that upon introduction of air via individual lines 14, i.e., a simultaneous loading with high pressure or vacuum, the hollow chambers 12 of the resonators 10 can be enlarged or reduced. This is indicated in the drawings as a dashed line representing the walls.

Figure 5:
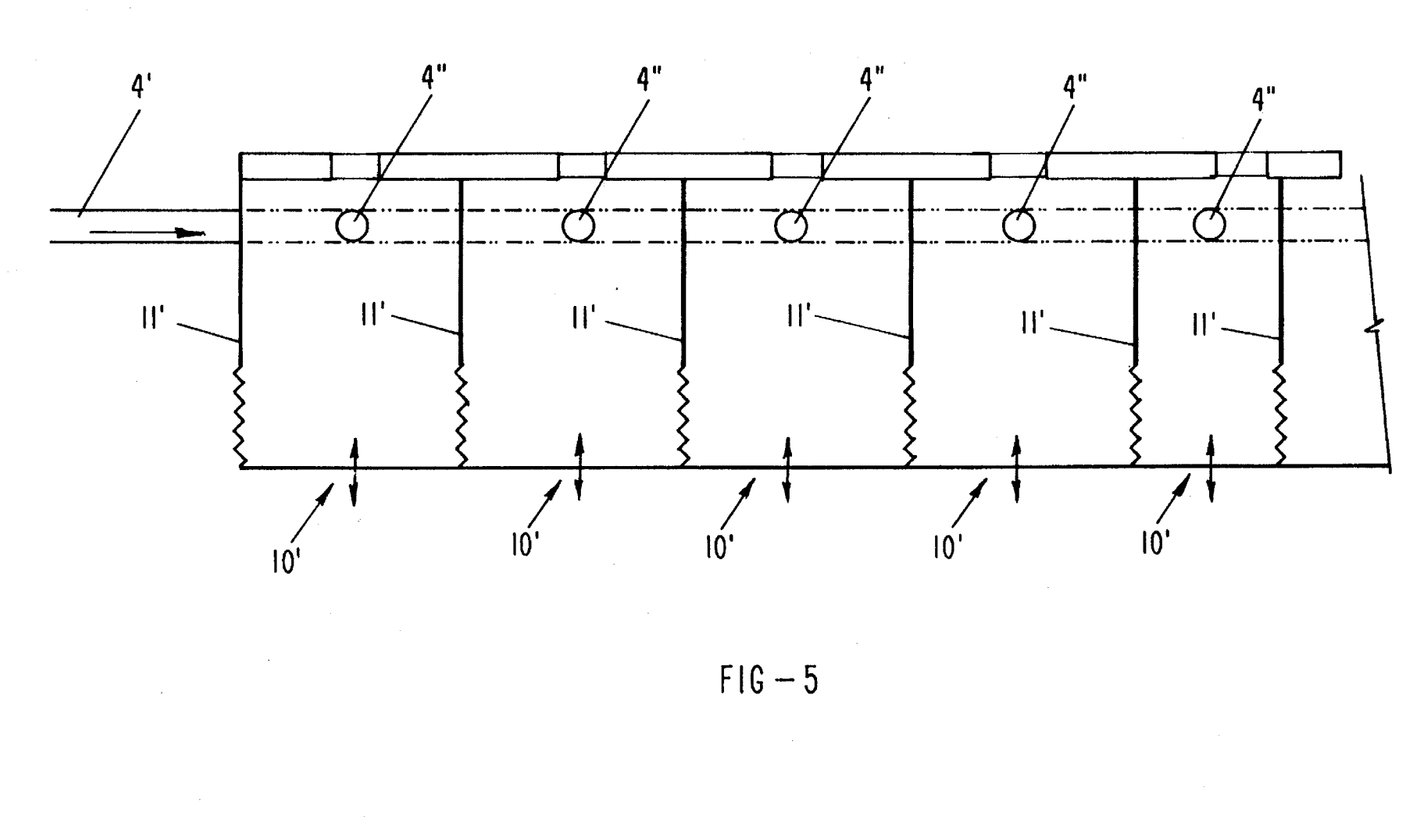

FIG. 5 shows another embodiment with resonators 10' arranged adjacent to one another with hollow chambers of different volumes. The volumes of the hollow chambers are directly loaded with compressed air via an air inlet line 4' which in each of the resonators 10' has an outlet opening 4". The walls 11 that delimit the hollow chambers are at least partially embodied as bellows-type double walls so that, via a suitable loading of the hollow chambers with compressed air, a change of the volume takes place. This is indicated by double arrows in FIG. 5.

Figure 6:
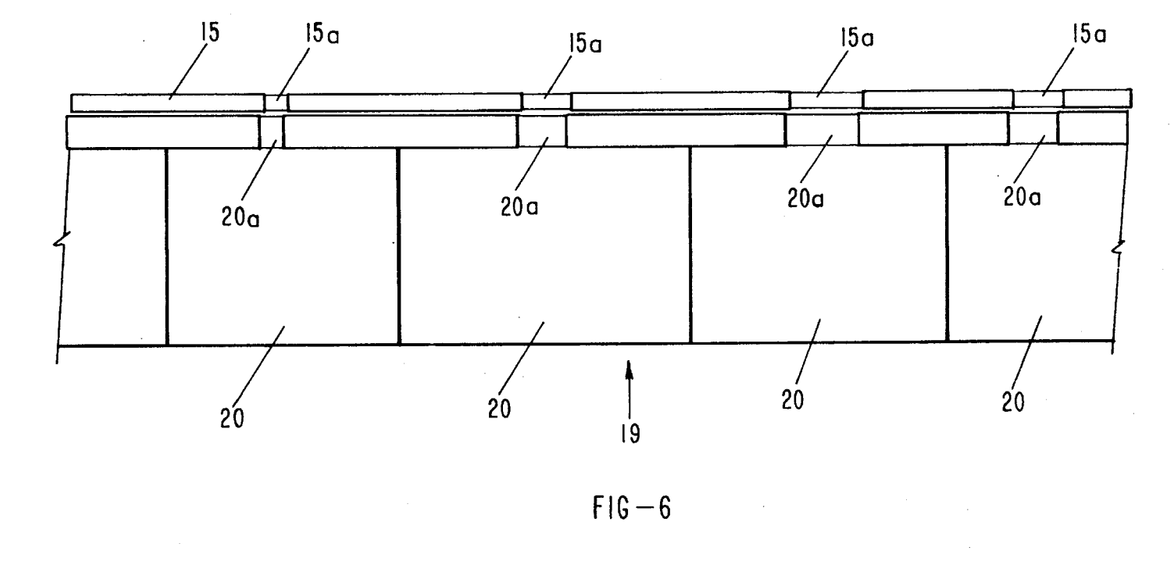
Figure 6A:
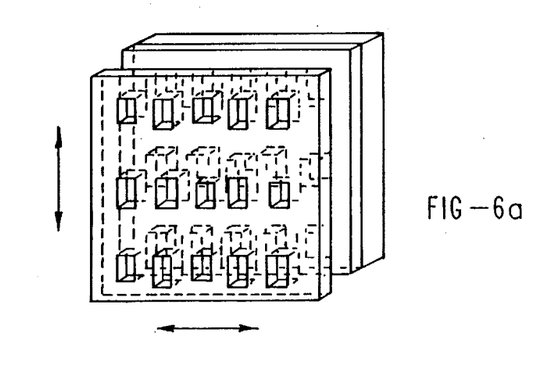
FIG. 6a shows a perspective view of the embodiment of FIG. 6.

In the embodiment represented in FIGS. 6 and 6a a plurality of resonators 20 is shown which have hollow chambers of different volumes and which are arranged in a housing or box 19. The resonator openings 20a of the resonators 20 each have a different size. A grid structure 15 is positioned on the box 19 and is provided with holes 15a. The holes 15a in the initial position of the grid structure 15 are congruent to the openings 20a. The grid structure 15 is slidable relative to the box 19. With a suitable displacement of the grid structure 15 (see arrows in FIG. 6a) a partial closing or opening of the inlet openings 20a is possible so that the characteristic frequency range of the individual resonators can be adjusted.

Figure 7:
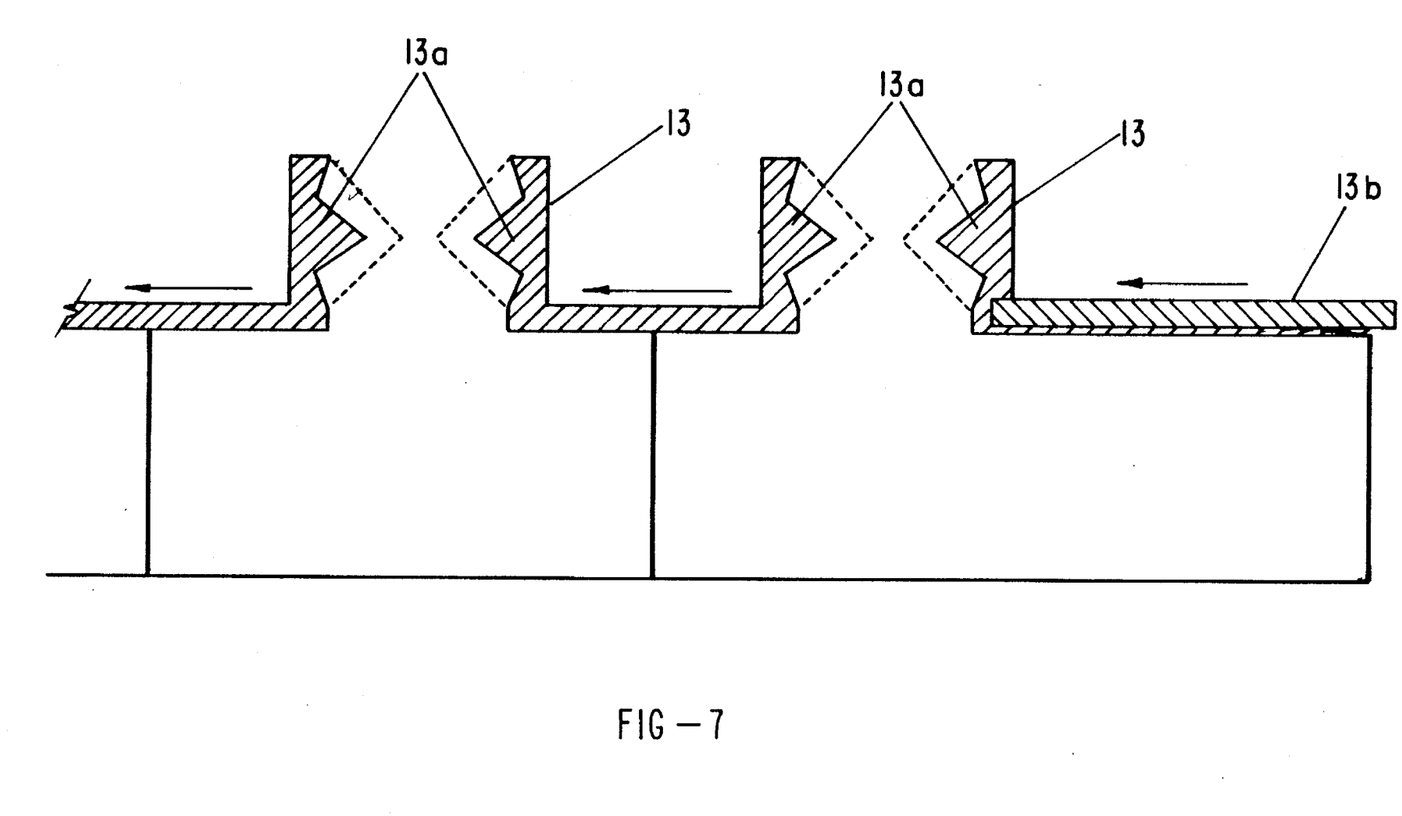

FIG. 7 shows an embodiment in which by changing the cross-section of the resonator neck a corresponding change of the characteristic frequency is possible. The resonator neck is surrounded by a bellows-shaped hollow body 13 the inner wall of which is provided with a wedge-shaped projection 13a. Depending on the inner pressure applied via line 13b, the inlet opening to the resonator hollow chamber is increased or decreased. The position indicated in dashed lines corresponds to the position with pressure loading. The arrow symbolize the direction of air flow.

Figure 8:
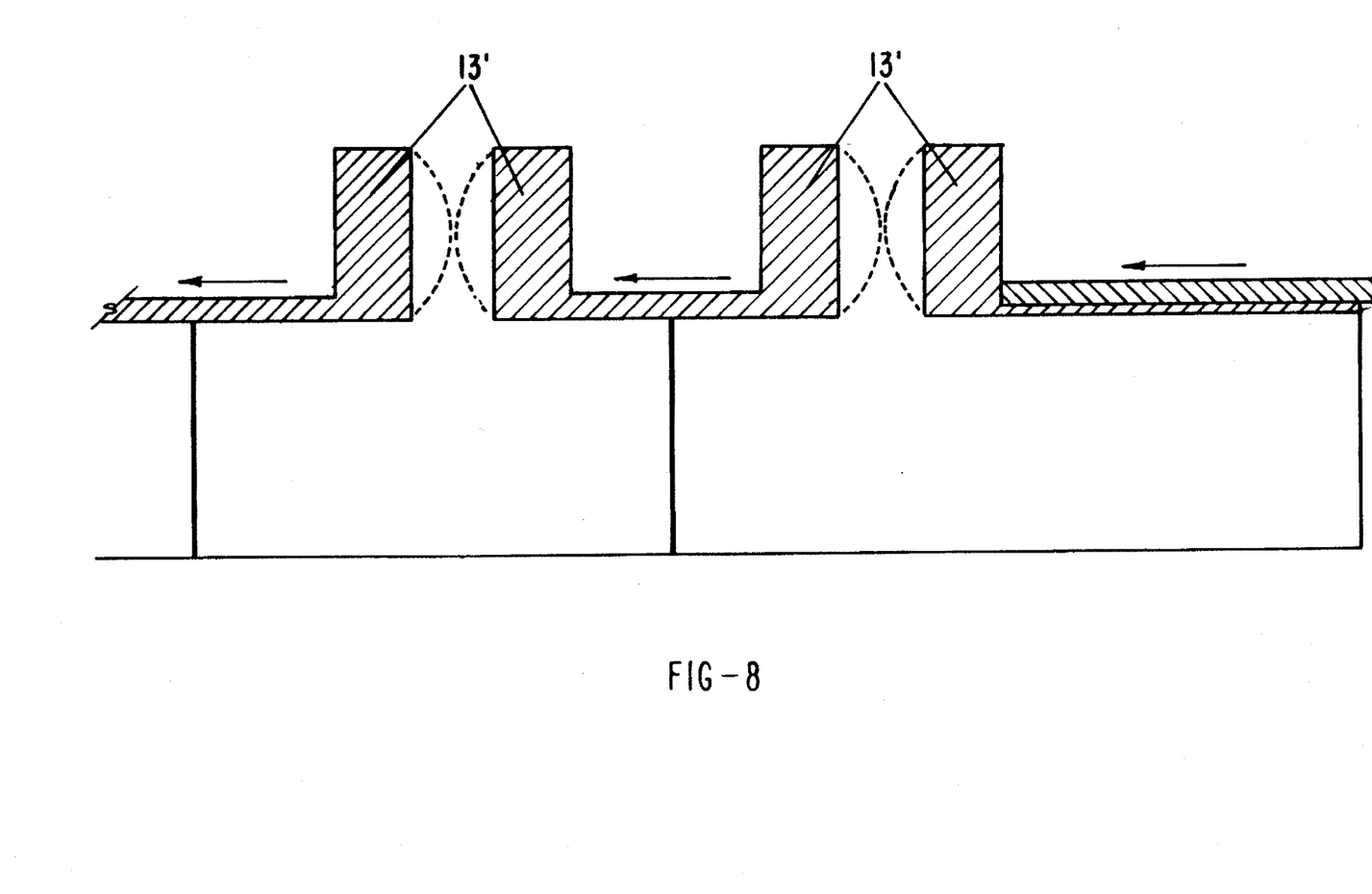

FIG. 8 shows a further embodiment in which the diameter of the resonator neck can be varied with a controllable mechanism, shown in the form of a pressure-controlled diaphragm 13', or a bellows, whereby the dashed line indicates the position when loaded with pressure. The arrows again show the direction of air flow.

Equivalent measures can also be carried out in a simple manner with hole resonators and Lambda/4 resonators. For example, it is expedient to change the resonator length or the volume of the hollow chamber in the embodiments according to FIGS. 3 and 4 in an equivalent manner.

The actual dimensions of the resonators as well as their corresponding range of adjustment are selected to correspond to the sound range of the tire/road surface noise to be effected of the tire in questions.

Figure 9:
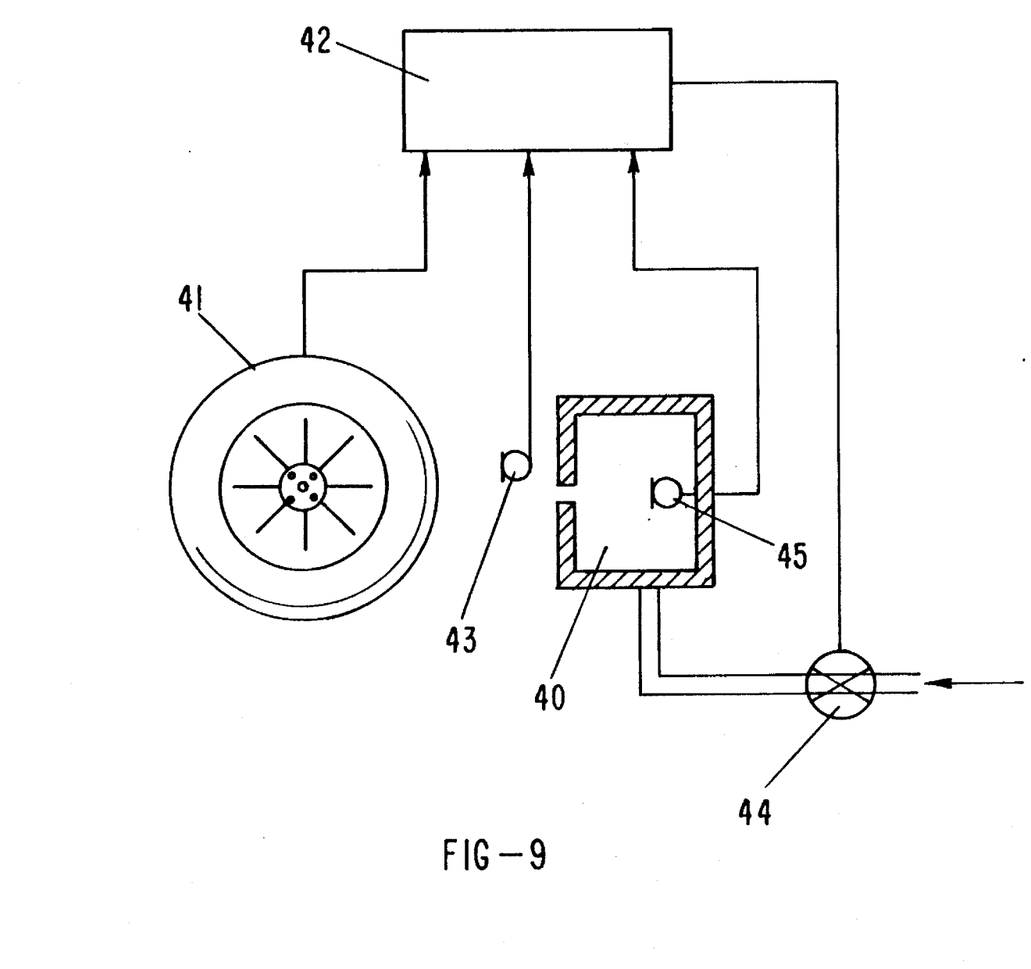
FIG. 9 shows schematically a possible control of the sound absorbers of FIGS. 3 to 8.

FIG. 9 shows two basic principles for controlling the resonators according to the embodiments of FIGS. 3 to 8. The arrangement comprises inventively embodied resonators and adjusting devices of which one resonator 40 and one adjusting device 44 is represented as well as an electronic control device 42 of a data processing unit.

The control device 42 can be supplied with the rpm of the wheel 41 as a parameter and determines, as a function of the known total number of tread blocks and the known sound projection characteristics of the respective tire, the specific resonators which, with respect to their resonance frequency, must be controlled or adjusted.

In the alternative, in front of or at each resonator 40 a sound receiver 43 (microphone) can be provided via which the course over time of the impinging sound pressure can be recorded and transmitted to the control device 42. In this scenario, the control device 42 performs a frequency, respectively, order analysis and controls the corresponding resonators.

The control device 42 can be embodied such that the rpm of the wheel 41 as well as the course of the sound pressure can be used as parameters which increases the redundancy of the control system and allows for an adaptation of the paramters as necessary.

Advantageously, the resonators 40 are provided with an acoustic/electric convertor 45, for example, a microphone, a piezo foil etc. via which the actual resonance frequency (actual value) of the corresponding resonator is determined. In this manner, a feedback control of the adjusted resonance frequency of the resonator 40 is possible.

The control device 42, in a manner known per se, may comprise an input filter, input amplifier, an analog or digital electronic device and the required control means for adjusting or switching the control member 44. The control of the resonators can take place via electric, pneumatic, or hydraulic means.

Figure 10:
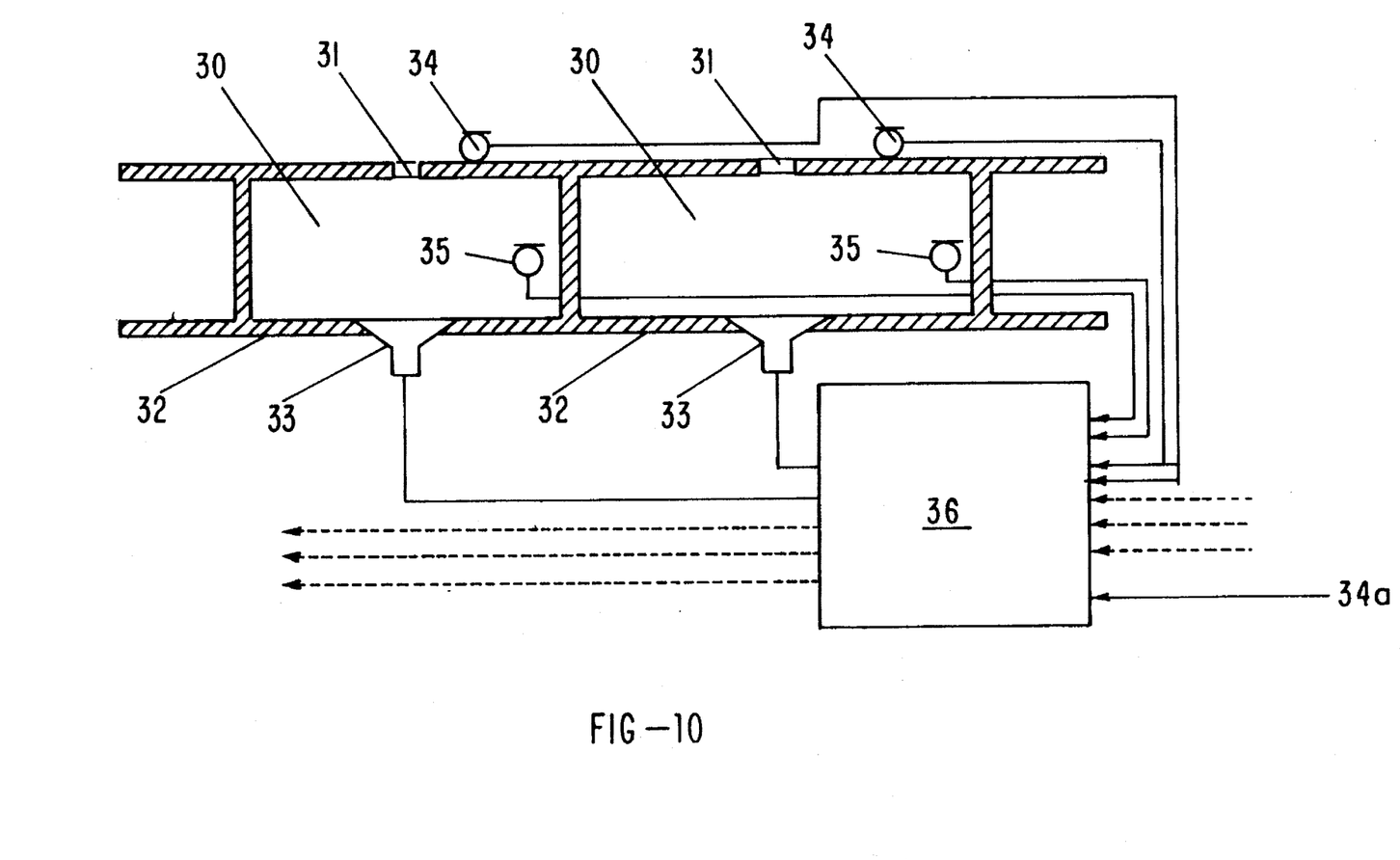
FIG. 10 shows schematically a further control arrangement of a further embodiment of the present invention.

Another embodiment with resonators that are adjustable via an adjusting device ("active") is represented in FIG. 10. This embodiment is based on the principle that the wall impedance of at least one of the resonator walls is to be changed actively. FIG. 9 shows a plurality of Helmholtz resonators 30 with resonator openings 31 whereby an actuator 33 is positioned on the wall 32 opposite the resonator opening 31. The actuator 33 can be in the form of a loudspeaker or in the form of a piezo foil or a piezo ceramic.

By changing the wall impedance for certain frequencies ranges, the resonator frequency can be adjusted in the same manner as by changing the volume of the resonator. Due to the swinging resonator wall the spring constant of the air volume enclosed within the resonator hollow chamber (i.e., the stiffness of the gas volume) is changed.

The characteristic frequency of this system (resonator frequency) can be determined as in the non-influenced system from the square root of the spring constant divided by the square root of the mass of the gas volume within the resonator neck. With sound receivers 34, for example, microphones, that are preferably positioned in front of the resonators 30, the course over time of the impinging sound pressure is recorded and transmitted to the control device 36. The control device 36 then performs a frequency or order analysis and controls the actuators 33.

In each resonator 30 it is possible to provide further a sensor 35, for example, a microphone, which controls or monitors the quality of the control. For a suitable design of the control device 36, it is possible to provide either sound receivers 34 or simply sensors 35 (feedback control). The control can be optimized by introducing into the control device 36 additionally the rpm of the wheel 34a as a controlling parameter.

For the aforedescribed control systems, in vehicles that are equipped with a ABS the already present sensor for determining the rpm of the wheel can provide the corresponding signal as a parameter to the control device 36, 42.

The control device 36, 42 may further comprise a device for switching the actively controlled resonators as a function of the velocity. For example, a resonator can be controlled in the lower velocity range for the second tread harmonic (for 50 pitches equal to the 100th order) while at higher velocities it can be controlled for the first tread harmonic (at 50 pitches equal to the 50th order). This reduces the control range of the resonators, and it is possible for certain velocities to control the dominating orders more effectively, i.e., with a higher number of resonators available.

In all of the aforementioned embodiments, it is possible to provide an air flow through the resonators whereby the air stream exiting through the resonator openings prevents a soiling of the resonators. It is further possible to cover for this purpose the resonator openings with materials that are acoustically substantially neutral, for example, a suitable diaphragm, a foil, a fabric, or a cap made of rubber or plastic.

It is furthermore advantageous when the intermediate spaces between the resonators, including the spaces between the individual resonator necks and/or the resonator openings, are filled with conventional sound-proofing material (foamed rubber, foamed plastic, glass wool, rock wool etc.). This improves the sound absorption in high frequency ranges (above 800 hertz), i.e., at high orders and high velocities.

The present invention is, of course, in no way restricted to the specific disclosure of the specification and drawings, but also encompasses any modifications within the scope of the appended claims.

What we claim is:

1. A device for reducing certain sound ranges of tire/road surface noise emitted by a motor vehicle equipped with an ABS system, said device comprising:

sound absorbers in the form of resonators positioned in an area of sound projection of the tire/road surface noise, said resonators adjustable to sound ranges that are proportional to the rpm of the wheel;

said resonators connected to the inner wall of a wheel well of the motorized vehicle;

an electronic control device for receiving a signal derived from the ABS system in the form of the rpm of the wheel;

said electronic control device adjusting said resonators as a function of a total number of tread blocks of the tire, the sound emission characteristics, and the rpm of the wheel.

2. A device according to claim 1, wherein said resonators are narrow band resonators having characteristic frequency ranges that are adjustable.

3. A device according to claim 2, wherein said characteristic frequency ranges of each said resonator is adjusted at least with respect to one of said frequencies of the tire/road surface noise, said frequencies changing with the rpm of the wheel.

4. A device according to claim 1, wherein at least one of said resonators is selected from the group consisting of a Helmholtz resonator, a Lambda/4 resonator, and a hole resonator.

5. A device according to claim 1, wherein said resonator is a Helmholtz resonator having an adjustable component selected from the group consisting of an adjustable resonator neck length and an adjustable resonator opening.

6. A device according to claim 5, wherein said resonator comprises a double wall bellows having an interior chamber that is inflatable with a variable air pressure.

7. A device according to claim 6, wherein said bellows is made of a material selected from the group consisting of rubber and plastic.

8. A device according to claim 5, wherein said resonator comprises a resonator neck in the form of a bellows-shaped hollow body having an inner wall with a wedge-shaped projection, wherein said bellows-shaped body is inflatable with a variable air pressure.

9. A device according to claim 5, wherein said resonator neck comprises an adjusting mechanism for adjusting an inner diameter of said resonator neck.

10. A device according to claim 9, wherein said mechanism comprises a pressure-sensitive diaphragm.

11. A device according to claim 5, wherein a plurality of said Helmholtz resonators are arranged in a common housing, wherein said Helmholtz resonators each have a different interior volume and each have an opening, said device further comprising a slidable grid structure with holes, wherein in an initial position of said grid structure said holes and said openings of said Helmholtz resonators are positioned congruent to one another.

12. A device according to claim 11, wherein said openings of said Helmholtz resonators have different sizes.

13. A device according to claim 1, wherein said resonator has a variable hollow chamber volume.

14. A device according to claim 13, wherein a plurality of said resonators are arranged adjacent to one another in a linear arrangement and wherein adjacent ones of said resonators have a common wall, wherein said common walls and external walls of said resonators positioned in end positions of said linear arrangement are in the form of double walls with expandable walls wherein the interior of said double walls is inflatable with a variable air pressure.

15. A device according to claim 13, wherein a plurality of said resonators are arranged adjacent to one another in a linear arrangement and wherein adjacent ones of said resonators have a common wall, wherein said common walls and external walls of said resonators positioned in end positions of said linear arrangement are in the form of double walls with at least partially expandable walls wherein the interior of said double walls is inflatable with a variable air pressure.

16. A device according to claim 1, wherein said electronic control device comprises adjusting means for adjusting said resonators, said means selected from the group consisting of electric, pneumatic, and hydraulic adjusting means.

17. A device according to claim 1, wherein said resonator comprises walls and an element for changing the wall impedance of at least one of said walls.

18. A device according to claim 17, wherein said element is a loudspeaker.

19. A device according to claim 17, wherein said element is connected to the surface of said at least one wall and is selected from the group consisting of a piezo foil and a piezoceramic element.

20. A device according to claim 17, wherein said resonator comprises a sound receiver for providing an input variable for said control device for controlling said resonator.

21. A device according to claim 20, wherein said sound receiver is a microphone.

22. A device according to claim 1, wherein said control device comprises a device for switching said resonators.

23. A device according to claim 1, wherein said control device adjusts the resonance frequencies of the spatially distributed resonators to the spatial and variable distribution of the impinging sound.

24. A device according to claim 1, wherein intermediate spaces between said resonators are filled with sound-absorbing material selected from the group consisting of foam rubber, foamed plastic, glass wool, and rock wool.

25. A device according to claim 1, wherein air flows through said resonators.

26. A device according to claim 1, wherein said resonators have openings that are covered so as to be substantially sound transmissive, wherein a material for covering is selected from the group consisting of a diaphragm, a foil, and a fabric.

27. A device according to claim 1, wherein said resonators are positioned in areas of main sound projection of the tire/road surface noise.

28. A device for reducing certain sound ranges of tire/road surface noise emitted by a motor vehicle, said device comprising:

sound absorbers in the form of resonators positioned in an area of sound projection of the tire/road surface noise, said resonators adjustable to sound ranges of adjustable frequencies;

said resonators connected to the inner wall of a wheel well of the motorized vehicle;

an electronic control device;

at least one sound receiver for receiving the sound emissions;

said at least one sound receiver transmitting signals of the sound pressure as a function of time to said electronic control device;

an adjusting device for adjusting said resonators such that the measured sound pressure signal is minimized.

29. A device according to claim 28, wherein said resonators are narrow band resonators adjustable in their characteristic frequency ranges.

30. A device according to claim 29, wherein said characteristic frequency ranges of each said resonator is adjusted at least with respect to one of said frequencies of the tire/road surface noise, said frequencies changing with the rpm of the wheel.

31. A device according to claim 28, wherein at least one of said resonators is selected from the group consisting of a Helmholtz resonator, a Lambda/4 resonator, and a hole resonator.

32. A device according to claim 28, wherein said resonator is a Helmholtz resonator having an adjustable component selected from the group consisting of an adjustable resonator neck length and an adjustable resonator opening.

33. A device according to claim 32, wherein said resonator comprises a double wall bellows having an interior chamber that is inflatable with a variable air pressure.

34. A device according to claim 33, wherein said bellows is made of a material selected from the group consisting of rubber and plastic.

35. A device according to claim 32, wherein said resonator comprises a resonator neck in the form of a bellows-shaped hollow body having an inner wall with a wedge-shaped projection, wherein said bellows-shaped body is inflatable with a variable air pressure.

36. A device according to claim 32, wherein said resonator neck comprises an adjusting mechanism for adjusting an inner diameter of said resonator neck.

37. A device according to claim 36, wherein said mechanism comprises a pressure-sensitive diaphragm.

38. A device according to claim 32, wherein a plurality of said Helmholtz resonators are arranged in a common housing, wherein said Helmholtz resonators each have a different interior volume and each have an opening, said device further comprising a slidable grid structure with holes, wherein in an initial position of said grid structure said holes and said openings of said Helmholtz resonators are positioned congruent to one another.

39. A device according to claim 38, wherein said openings of said Helmholtz resonators have different sizes.

40. A device according to claim 28, wherein said resonator has a variable hollow chamber volume.

41. A device according to claim 40, wherein a plurality of said resonators are arranged adjacent to one another in a linear and wherein adjacent ones of said resonators have a common wall, wherein said common walls and external walls of said resonators positioned in end positions of said linear arrangement are in the form of double walls with expandable walls wherein the interior of said double walls is inflatable with a variable air pressure.

42. A device according to claim 40, wherein a plurality of said resonators are arranged adjacent to one another in a linear arrangement and wherein adjacent ones of said resonators have a common wall, wherein said common walls and external walls of said resonators positioned in end positions of said linear arrangement are in the form of double walls with at least partially expandable walls wherein the interior of said double walls is inflatable with a variable air pressure.

43. A device according to claim 28, wherein said electronic control device comprises adjusting means for adjusting said resonators, said means selected from the group consisting of electric, pneumatic and hydraulic adjusting means.

44. A device according to claim 28, wherein said resonator comprises walls and an element for changing the wall impedance of at least one of said walls.

45. A device according to claim 44, wherein said element is a loudspeaker.

46. A device according to claim 44, wherein said element is connected to the surface of said at least one wall and is selected from the group consisting of a piezo foil and a piezoceramic element.

47. A device according to claim 44, wherein said resonator comprises a sound receiver for providing an input variable for said control device for controlling said resonator.

48. A device according to claim 47, wherein said sound receiver is a microphone.

49. A device according to claim 28, wherein said control device comprises a device for switching said resonators.

50. A device according to claim 28, wherein said control device adjusts the resonance frequencies of the spatially distributed resonators to the spatial and variable distribution of the impinging sound.

51. A device according to claim 28, wherein intermediate spaces between said resonators are filled with sound-absorbing material selected from the group consisting of foam rubber, foamed plastic, glass wool, and rock wool.

52. A device according to claim 28, wherein air flows through said resonators.

53. A device according to claim 28, wherein said resonators have openings that are covered so as to be substantially sound transmissive, wherein a material for covering is selected from the group consisting of a diaphragm, a foil, and a fabric.

54. A device according to claim 28, wherein said resonators are positioned in areas of main sound projection of the tire/road surface noise.

55. A device according to claim 28, wherein said at least one sound receiver is positioned in front of said resonators and wherein said electronic control device adjusts said resonators according to a data analysis selected from the group consisting of a frequency analysis and an order analysis.

56. A device according to claim 28, wherein said at least one sound receiver is positioned at said resonators and wherein said electronic control device adjusts said resonators according to a data analysis selected from the group consisting of a frequency analysis and an order analysis.

57. A device for reducing certain sound ranges of tire/road surface noise emitted by a motor vehicle equipped with an ABS system, said device comprising:

sound absorbers in the form of resonators positioned in an area of sound projection of the tire/road surface noise, said resonators adjustable to sound ranges that are proportional to the rpm of the wheel;

said resonators connected to the inner wall of a wheel well of the motorized vehicle;

a data processing unit comprising an electronic control device;

at least one sound receiver for receiving the sound emissions;

said at least one sound receiver transmitting signals of the sound pressure as a function of time to said electronic control device;

an adjusting device, connected downstream of said data processing unit, for adjusting said resonators such that for selected frequency ranges of the rpm of the wheel the measured sound pressure signal is minimized.

58. A device according to claim 57, wherein said resonators are narrow band resonators adjustable in their characteristic frequency ranges.

59. A device according to claim 58, wherein said characteristic frequency ranges of each said resonator is adjusted at least with respect to one of said frequencies of the tire/road surface noise, said frequencies changing with the rpm of the wheel.

60. A device according to claim 57, wherein at least one of said resonators is selected from the group consisting of a Helmholtz resonator, a Lambda/4 resonator, and a hole resonator.

61. A device according to claim 57, wherein said resonator is a Helmholtz resonator having an adjustable component selected from the group consisting of an adjustable resonator neck length and an adjustable resonator opening.

62. A device according to claim 61, wherein said resonator comprises a double wall bellows having an interior chamber that is inflatable with a variable air pressure.

63. A device according to claim 62, wherein said bellows is made of a material selected from the group consisting of rubber and plastic.

64. A device according to claim 61, wherein said resonator comprises a resonator neck in the form of a bellows-shaped hollow body having an inner wall with a wedge-shaped projection, wherein said bellows-shaped body is inflatable with a variable air pressure.

65. A device according to claim 61, wherein said resonator neck comprises an adjusting mechanism for adjusting an inner diameter of said resonator neck.

66. A device according to claim 65, wherein said mechanism comprises a pressure-sensitive diaphragm.

67. A device according to claim 61, wherein a plurality of said Helmholtz resonators are arranged in a common housing, wherein said Helmholtz resonators each have a different interior volume and each have an opening, said device further comprising a slidable grid structure with holes, wherein in an initial position of said grid structure said holes and said openings of said Helmholtz resonators are positioned congruent to one another.

68. A device according to claim 67, wherein said openings of said Helmholtz resonators have different sizes.

69. A device according to claim 57, wherein said resonator has a variable hollow chamber volume.

70. A device according to claim 69, wherein a plurality of said resonators are arranged adjacent to one another in a linear and wherein adjacent ones of said resonators have a common wall, wherein said common walls and external walls of said resonators positioned in end positions of said linear arrangement are in the form of double walls with expandable walls wherein the interior of said double walls is inflatable with a variable air pressure.

71. A device according to claim 69, wherein a plurality of said resonators 10 are arranged adjacent to one another in a linear arrangement and wherein adjacent ones of said resonators have a common wall, wherein said common walls and external walls of said resonators positioned in end positions of said linear arrangement are in the form of double walls with at least partially expandable walls wherein the interior of said double walls is inflatable with a variable air pressure.

72. A device according to claim 57, wherein said electronic control device comprises adjusting means for adjusting said resonators, said means selected from the group consisting of electric, pneumatic and hydraulic adjusting means.

73. A device according to claim 57, wherein said resonator comprises walls and an element for changing the wall impedance of at least one of said walls.

74. A device according to claim 73, wherein said element is a loudspeaker.

75. A device according to claim 73, wherein said element is connected to the surface of said at least one wall and is selected from the group consisting of a piezo foil and a piezoceramic element.

76. A device according to claim 73, wherein said resonator comprises a sound receiver for providing an input variable for said control device for controlling said resonator.

77. A device according to claim 76, wherein said sound receiver is a microphone.

78. A device according to claim 57, wherein said control device comprises a device for switching said resonators.

79. A device according to claim 57, wherein said control device adjusts the resonance frequencies of the spatially distributed resonators to the spatial and variable distribution of the impinging sound.

80. A device according to claim 57, wherein intermediate spaces between said resonators are filled with sound-absorbing material selected from the group consisting of foam rubber, foamed plastic, glass wool, and rock wool.

81. A device according to claim 57, wherein air flows through said resonators.

82. A device according to claim 57, wherein said resonators have openings that are covered so as to be substantially sound transmissive, wherein a material for covering is selected from the group consisting of a diaphragm, a foil, and a fabric.

83. A device according to claim 57, wherein said resonators are positioned in areas of main sound projection of the tire/road surface noise.

* * * * *